United States Patent
Kusic (10) Patent No.: US 7,635,104 B1
(45) Date of Patent: Dec. 22, 2009

(54) AIRCRAFT SPIRALING MECHANISM WITH JET ASSISTANCE—B

(76) Inventor: Tom Kusic, P.O. Box 932, Melbourne, VIC (AU) 3001

( * ) Notice: Subject to any disclaimer, the term of this patent is extended or adjusted under 35 U.S.C. 154(b) by 407 days.

(21) Appl. No.: 11/601,804

(22) Filed: Nov. 20, 2006

Related U.S. Application Data (63) Continuation-in-part of application No. 09/886,639, filed on Jun. 22, 2001, now Pat. No. 6,708,923.

(51) Int. Cl.
*F41G 7/00* (2006.01)
(52) U.S. Cl. .................. 244/3.22; 244/3.1; 244/62; 244/55
(58) Field of Classification Search ............... 244/3.21, 244/3.22, 3.23, 3.1, 53 R, 62, 54, 55, 56
See application file for complete search history.

(56) References Cited

U.S. PATENT DOCUMENTS

| | | |
|---|---|---|
| 2,924,174 A | 2/1960 | McLean |
| 3,603,533 A | 9/1971 | Stripling |
| 4,029,270 A | 6/1977 | Niemeier |
| 4,086,841 A | 5/1978 | MacDonald |
| 4,281,810 A | 8/1981 | Poisson-Quinton et al. |
| 4,373,689 A | 2/1983 | Walker |
| 4,565,340 A | 1/1986 | Bains |
| 4,903,917 A | 2/1990 | Peller et al. |
| 4,964,593 A | 10/1990 | Kranz |

(Continued)

FOREIGN PATENT DOCUMENTS

AU   199948730 A1   3/2001

(Continued)

OTHER PUBLICATIONS

Authors: Gary Hyland and Anton Gill Title of Book: Last Talons of the Eagle Published by: Headline Book Publishing, 1998 & 1999, A Division of Hodger Headline PLC 338 Euston Road London NW1 3BH, ISBN: 074725964x pp. 249-250 and Illustration on Un-Numbered Page after Page No. 184.

*Primary Examiner*—Timothy D Collins (57) ABSTRACT

An aircraft 1 with a spiral inducing assembly 2 which is capable of inducing the aircraft to travel in a continuous spiraling motion without the aircraft rolling. A ramjet 6b is attached to a tube 3a that is able to rotate around the encircled part of the fuselage. The ramjet 6b is able to rotate in a pivoting manner on the rotate-able tube 3a with respect to the rotate-able tube 3a, thereby changing their pitch relative to the longitudinal axis of the rotate-able tube 3a. Ramjet 6b is rotated as is another ramjet on the right side of the tube 3a. The rotate-able tube 3a is rotated by means of an electric motor 3b rotating a wheel 3c. The difference in degree of rotation between the ramjets makes the ramjet 6b exert a greater force on the rotate-able tube 3a than the ramjet on the right side when the ramjets are rotated in the same direction. The imbalance between the rotational forces thus causes the rotate-able tube 3a to rotate. When rotated, the ramjets would exert a lateral force on the rotate-able tube 3a. Thus, the ramjets would push the rotate-able tube sideways. But as the rotate-able tube is pushed sideways, it rotates, and hence the lateral direction of push constantly revolves, causing a spiraling motion of the aircraft when in flight.

18 Claims, 11 Drawing Sheets

U.S. PATENT DOCUMENTS

| | | | |
|---|---|---|---|
| 5,048,772 | A | 9/1991 | Wisshaupt |
| 5,139,215 | A | 8/1992 | Peckham |
| 5,176,338 | A | 1/1993 | Silich |
| 5,186,413 | A | 2/1993 | Deakin |
| 5,271,579 | A | 12/1993 | DeLuca |
| 5,322,243 | A | 6/1994 | Stoy |
| 5,417,393 | A | 5/1995 | Klestadt |
| 5,975,461 | A | 11/1999 | Ullrich |
| 6,443,391 | B1 | 9/2002 | Malejko et al. |
| 6,511,016 | B2 | 1/2003 | Bar et al. |
| 6,644,587 | B2 | 11/2003 | Kusic |
| 6,648,433 | B2 | 11/2003 | Kusic |
| 6,708,923 | B2 | 3/2004 | Kusic |
| 7,093,791 | B2 | 8/2006 | Kusic |
| 2002/0195520 | A1 | 12/2002 | Kusic |
| 2002/0195521 | A1 | 12/2002 | Kusic |
| 2002/0195522 | A1 | 12/2002 | Kusic |
| 2004/0155144 | A1 | 8/2004 | Kusic |

FOREIGN PATENT DOCUMENTS

| | | |
|---|---|---|
| DE | 3242392 A1 | 5/1984 |
| IT | 588899 | 2/1959 |
| JP | 94/6-26799 | 2/1994 |
| WO | WO 02/102660 A1 | 12/2002 |

AIRCRAFT SPIRALING MECHANISM WITH JET ASSISTANCE—B

CROSS REFERENCE TO RELATED APPLICATIONS

This is a continuation-in-part patent application, being a continuation-in-part of the U.S. patent application numbered 09/886,639 filed Jun. 22 2001 now U.S. Pat. No. 6,708,923.

STATEMENT REGARDING FEDERALLY SPONSORED RESEARCH OR DEVELOPMENT

Not applicable.

REFERENCE TO SEQUENCE LISTING

Not applicable.

BACKGROUND OF THE INVENTION

1. Field of the Invention

This invention is related to the field of aviation dealing with missiles and military attack airplanes.

The aim of this invention is to provide an aircraft that has higher chance of surviving attacks from anti-aircraft and anti-missile weapons. The aircraft can be in the form a missile. The aircraft according to this invention is fitted with a mechanism that enables the aircraft to travel in a continuous spiraling motion while flying when the mechanism is engaged. The mechanism is such that once activated, the spiraling motion is automatic. The mechanism can also be disengaged by a pilot when so desired if the aircraft carries a pilot. The spiraling motion is achieved during flight without having to roll the aircraft.

The mechanism could also be fitted to a missile. A spiraling missile would be more difficult to destroy by lasers, machine guns and anti-missile missiles than a missile travelling in a straight line.

2. Description of the Related Art

U.S. Pat. No. 5,322,243 in the name of Stoy shows a missile with variable pitch fins on a rotate-able tube that are moved by independent actuators, and a computer to control the operation of the actuators. While the intention of Stoy wasn't to provide a missile that could travel in a continuous spiraling motion, such a motion could be achieved by the missile shown in Stoy's patent with appropriate programming of the controlling computer. The current invention provides a mechanical means for inducing a spiraling motion in an aircraft that does not need a computer to control the position of the fins, jets or rockets on a rotate-able tube to induce a spiraling motion in the aircraft.

BRIEF SUMMARY OF THE INVENTION

In this invention the spiraling motion of a fast flying aircraft or missile is achieved by using moveable thrust producing motors on a rotate-able tube, with the tube encircling a part of the main body aircraft and with the tube able to rotate around the encircled part of the aircraft.

The thrust producing motors are attached to the rotate-able tube so that they can be rotated in a pivoting manner relative to the rotate-able tube. That is, if the rotate-able tube was kept in a fixed position on the airplane so as not to rotate, the movement of the thrust producing motors would resemble the movement of canards on aircraft such as the Eurofighter and the recent version of the Sukhoi Su-37. The thrust producing motors would turn in the same direction. With the thrust producing motors horizontal, the aircraft or missile would be allowed to fly smoothly. When the thrust producing motors are rotated from the horizontal position, they would act to pull the aircraft or missile into a spiraling motion.

For the aircraft to enter a spiraling motion, the thrust producing motors would need to revolve around the body of the aircraft so that the aircraft is pulled in changing directions. In the invention this is achieved by using the rotate-able tube that allows the thrust producing motors to revolve around the main body of the aircraft—using the rotate-able tube as a means of travelling around a part of the main body of the aircraft. An electric motor connected to the fuselage rotating a wheel is one form that can be used to rotate the tube. Another method is to use a fin positioned on the rotate-able tube such that dynamic action of air on the fin could cause the rotate-able tube to rotate.

Although the aircraft could be in the form of a jet propelled airplane, it could be in the form of any one of a range of aircraft such as guided missiles and unguided missiles. It could also be in the form of non-powered aircraft such as gliders or winged bombs that are designed to glide to a target.

BRIEF DESCRIPTION OF THE SEVERAL VIEWS OF THE DRAWINGS

Embodiments of the invention will now be described by way of example with reference to the accompanying drawings, of which.

DETAILED DESCRIPTION OF THE DRAWINGS

Figure 1:
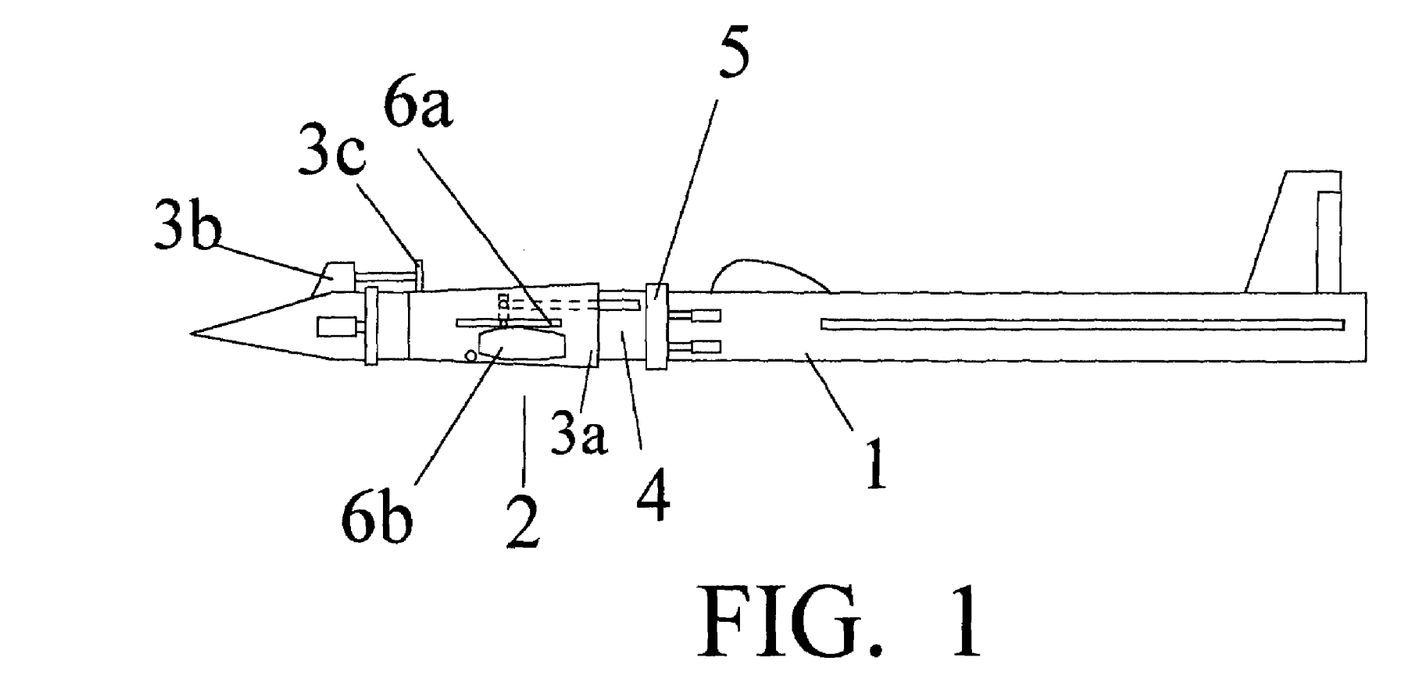
FIG. 1 shows the left side view of an aircraft in the form of a jet airplane comprising a spiral inducing assembly.

FIG. 1 shows one form of the aircraft 1 as a jet propelled airplane 1, fitted with a spiral inducing assembly 2.

Figure 3:
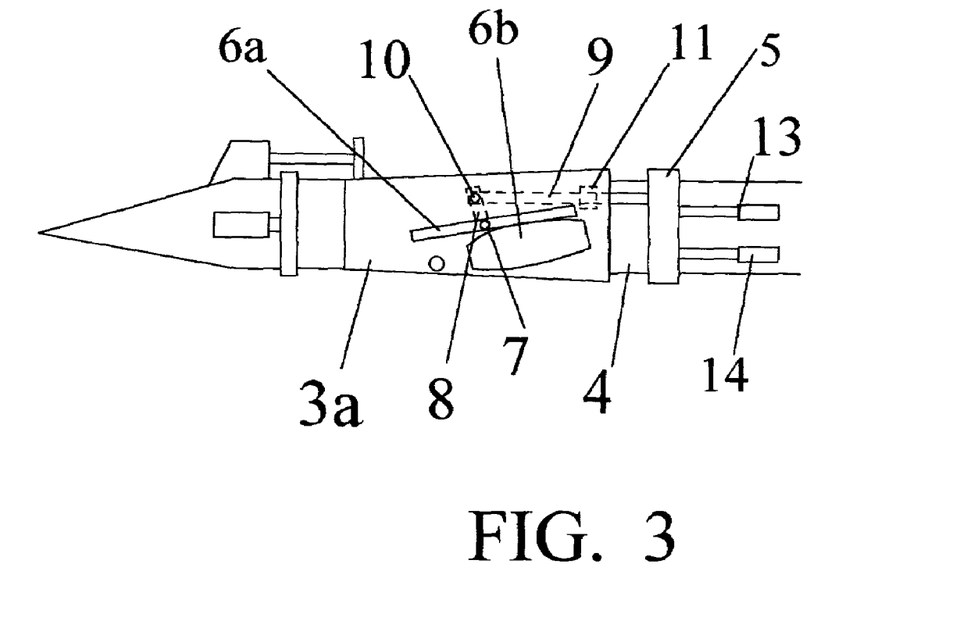
FIG. 3 shows the left side of the spiral inducing assembly of FIG. 1 after the spiral inducing assembly has been activated to cause a spiraling motion to occur.

Referring to FIG. 1, a rotate-able tube 3a forming part of the spiral inducing assembly 2 can be seen encircling part of the fuselage 4 of the airplane 1. The fuselage has a fore end and aft end. Referring to this tube 3a as the primary tube 3a, the primary tube 3a is able to rotate around the part of the fuselage encircled by the primary tube. The primary tube is shown as being narrower in the front than at the rear. An electric motor 3b rotating a wheel 3c is used to rotate the rotate-able tube 3a relative to the fuselage 4. Also shown is another tube 5 that is fitted to the airplane such that it encircles part of the fuselage 4 of the airplane. Referring to this tube 5 as the activation tube 5, the activation tube 5 is fitted so that it can be moved in a forward direction relative to the part of the fuselage 4 encircled by the activation tube and then back to its original position on the fuselage. FIG. 1 also shows the edge of one horizontal fin 6a that is connected to the outside of the primary tube 3a. The fin 6a is connected to the outside of primary tube 3a such that it can rotate in a pivoting manner as shown in FIG. 3. A ramjet 6b is attached to the fin 6a. Rotation of the fin causes the ramjet to rotate relative to the rotate-able tube.

Figure 2:
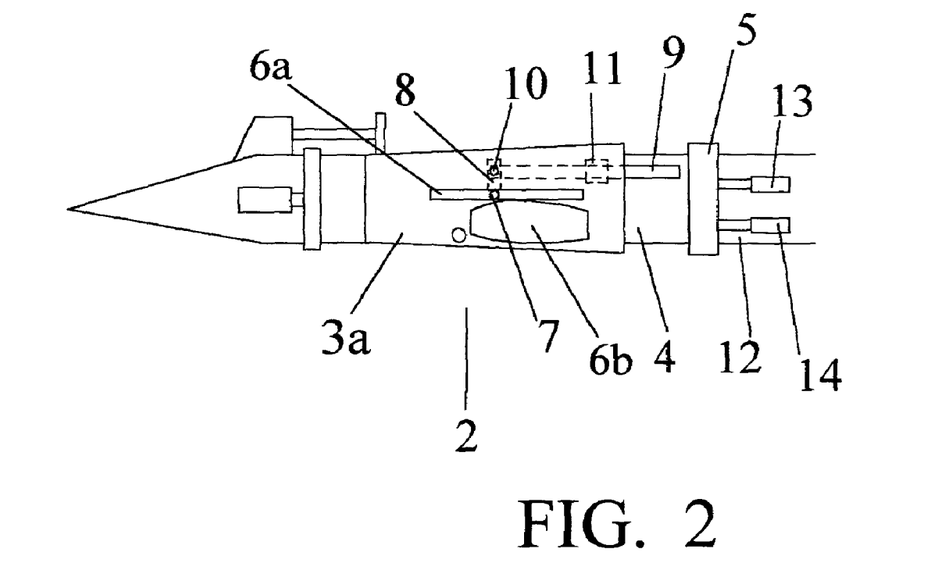
FIG. 2 shows an enlarged view of the spiral inducing assembly of FIG. 1.

FIG. 2 shows an enlarged illustration of the left side of the spiral inducing assembly 2. The fin 6a in FIG. 2 is connected to the outside of the primary tube 3a by a connecting joint which is in the form of a connecting rod 7. Extended from the connecting rod 7 in FIG. 2 is a protruding section 8 which is used to rotate the connecting rod 7. Rotation of the connecting rod 7 causes the fin 6a and ramjet 6b to rotate in a pivoting manner around the connecting rod 7 (in the manner shown in FIG. 3). Linked to the protruding section 8 in FIG. 2 is a stem 9. Referring to this stem 9 as an activation stem 9, the activation stem 9 is used as a means for pushing the protruding section 8 such that when the protruding section 8 is pushed, the protruding section 8 forces the connecting rod 7 to rotate around the longitudinal axis of the connecting rod 7. The activation stem 9 is linked to the protruding section 8 by a rivet 10. The activation stem 9 is shown as being fitted on the inside of the primary tube 3a and is supported inside the primary tube 3a by a retaining bracket 11. The retaining bracket 11 is rigidly joined to the inside of the primary tube but is channeled to allow the activation stem 9 to move longitudinally between the retaining bracket 11 and the primary tube 3a. The activation stem 9 is allowed to protrude rearward from the primary tube so that it can be reached by the activation tube 5 when the activation tube 5 is moved forward on the fuselage 4. The activation tube 5 is forced to move forward by an activation mechanism 12 consisting of hydraulic actuators 13 and 14.

FIG. 3 shows that as the activation tube 5 is forced to move forward on the fuselage 4 when the hydraulic actuators 13 and 14 extend, it eventually makes contact with the activation stem 9. As the activation tube 5 is forced to move further forward, it pushes the activation stem 9 forward on primary tube. As the activation stem 9 is pushed forward, the activation stem pushes against the protruding section 8 and moves the protruding section 8, thereby rotating the fin 6a and ramjet 6b around the connecting rod 7 in a pivoting manner.

In FIG. 3 a rivet 10 is shown connecting the activation stem 9 to the protruding section 8, which allows movement between the activation stem 9 and the protruding section 8. The retaining bracket 11 keeps the activation stem from moving laterally around the primary tube. The retaining bracket 11 however does allow longitudinal sliding movement of the activation stem 9 so that it can be pushed and moved by the activation tube 5.

Figure 4:
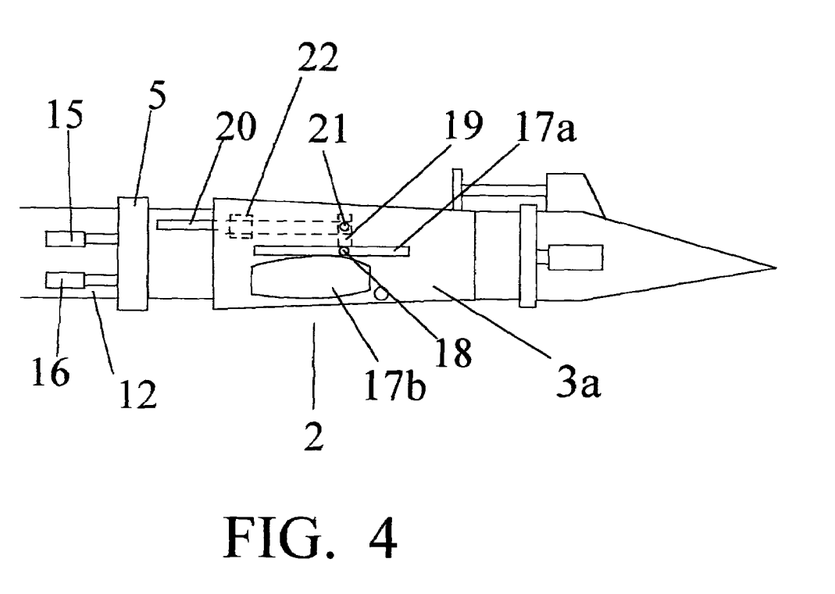
FIG. 4 shows the right side of the spiral inducing assembly of FIG. 1.

FIG. 4 shows the right side of the spiral inducing assembly 2 of FIG. 1. Shown is another fin 17a, a ramjet 17b and another connecting joint in the form of a connecting rod 18 that connects the fin 17a to the outside of the primary tube 3a. Another protruding section 19 is used to rotate the connecting rod 18, and the activation stem 20 is used to push the protruding section 19, with the activation stem 20 linked to the protruding section 19 by a rivet 21. Also visible in FIG. 4 is the activation tube 5. The connecting rod 18 allows the fin 17a and ramjet 17b to rotate in a pivoting manner. Another retaining bracket 22 is shown supporting the respective activation stem 20. FIG. 4 shows the hydraulic actuators 15 and 16 located on the right side of the spiral inducing assembly 2 which also form part of the activation mechanism 12 by which the activation tube 5 is forced to move. When the hydraulic actuators 13 14 15 and 16 are forced to extend as hydraulic pressure is applied to them, they force the activation tube 5 to move forward as shown in FIG. 3.

Thus, it can be seen from FIGS. 1, 2, 3 and 4 that the activation tube 5, the activation stems 9 and 20, retaining brackets 11 and 22, protruding sections 8 and 19, rivets 10 and 21 used to connect the activation stems 9 and 20 to respective protruding sections 8 and 19, the connecting joints 7 and 18 in the form of connecting rods 7 and 18, and the activation mechanism 12 used to move the activation tube 5 consisting of the hydraulic actuators 13, 14, 15 and 16, collectively form a ramjet rotating mechanism, by which ramjet rotating mechanism the ramjets can be rotated in the same direction, so that the rotational force exerted on the primary tube by one ramjet can be overcome by the rotational force exerted on the primary tube by another ramjet, with rotation of the primary tube 3a being achieved by means of the electric motor 3b and the wheel 3c connected to the electric motor.

While ramjets have been shown, other types of jet engines could also be used. Turbojets and turbofans could be used instead of ramjets. Solid fuel or liquid fuel rocket motors could also be used instead of ramjets. If rocket motors are used, they could be rigidly attached to the primary tube, positioned so that thrust could cause the primary tube to rotate and be forced in lateral directions.

Figure 5:
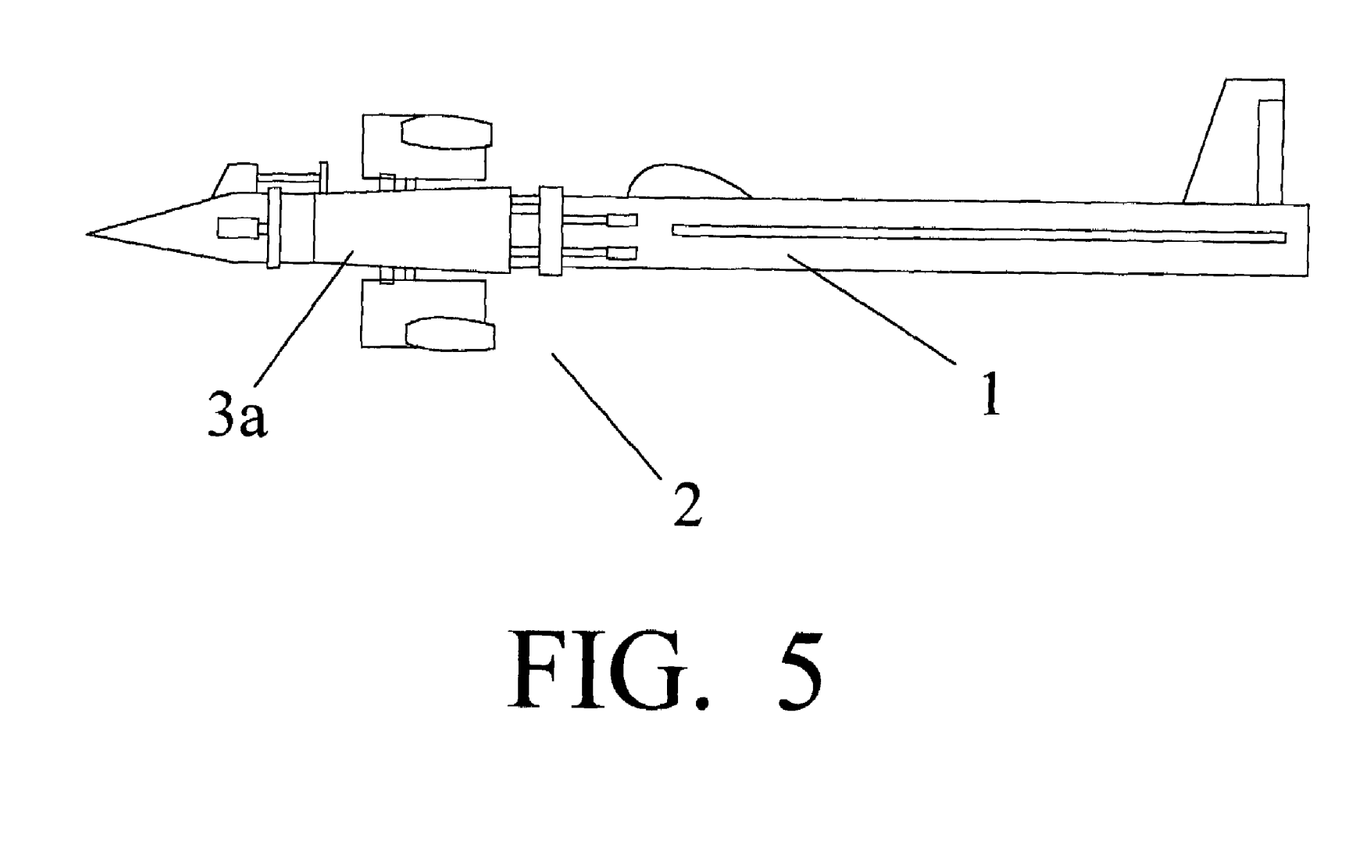
FIG. 5 shows the spiral inducing assembly of FIG. 1 in an activated state, and after the rotate-able tube has been rotated.

FIG. 5 shows the spiral inducing assembly of FIG. 1 with the primary tube 3a in a state of rotation. It can be seen comparing FIG. 5 with FIG. 1 how the lateral forces on the airplane would be constantly changing, enabling the spiral inducing assembly 2, to force the airplane 1 to travel in a continuous spiraling motion.

Figure 6:
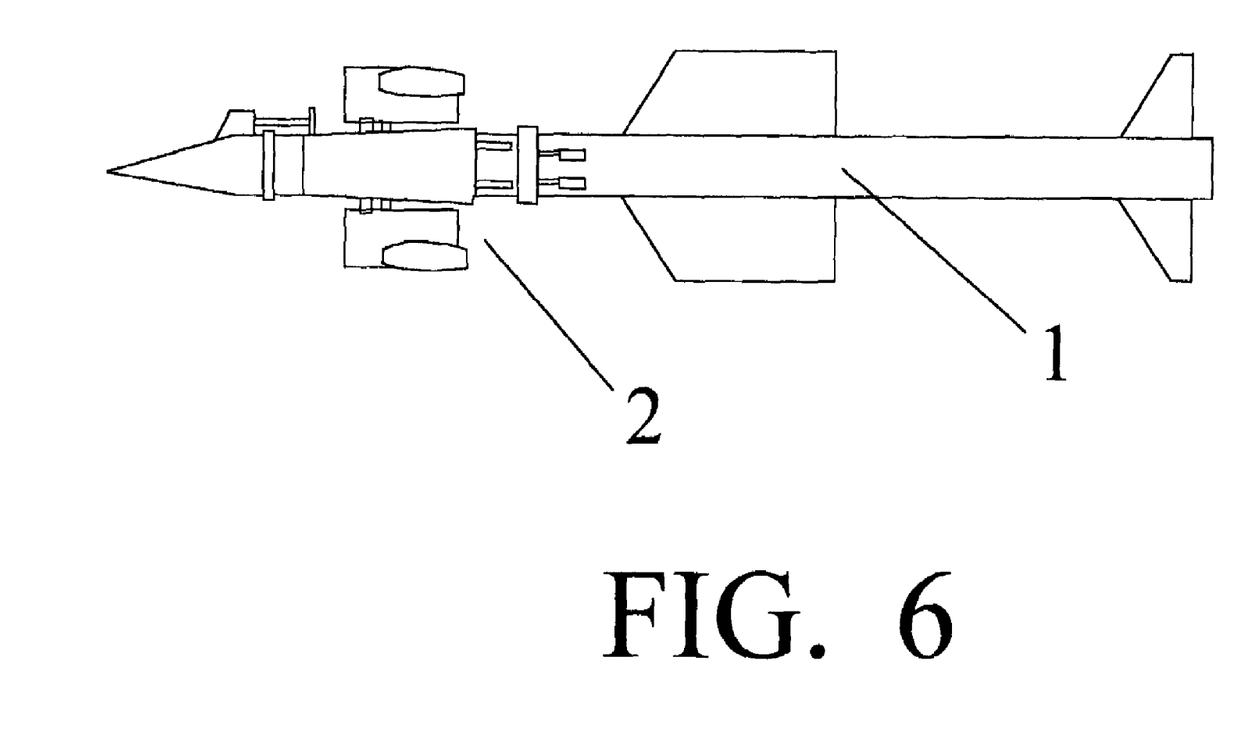
FIG. 6 shows an aircraft according to this invention in the form of a missile.

FIG. 6 shows an aircraft according to this invention in the form of a missile 1 with a spiral inducing assembly 2 of FIG. 1.

Figure 7:
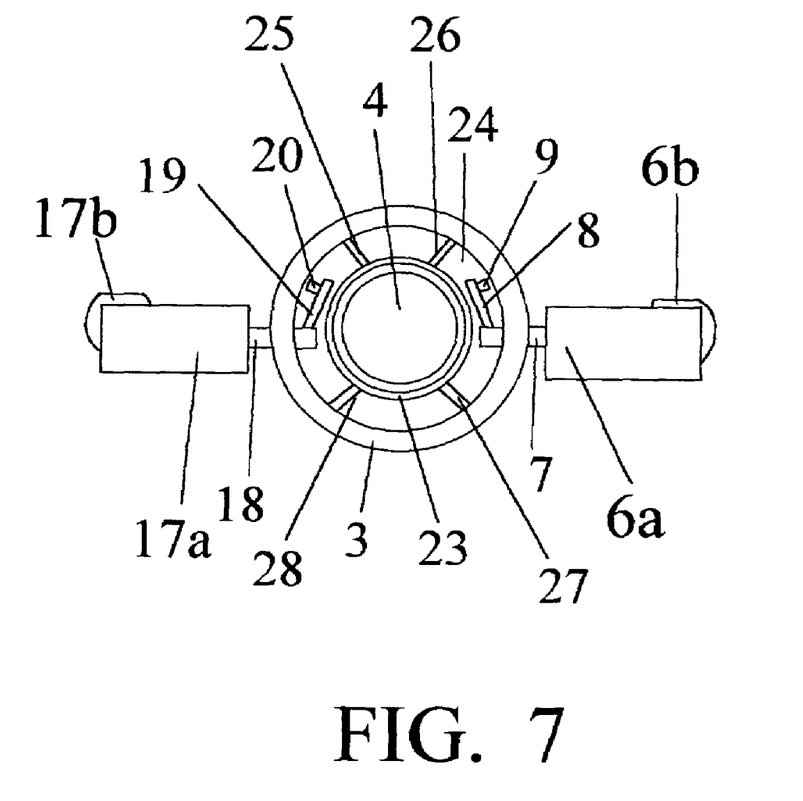
FIG. 7 shows a cross-sectional view of the spiral inducing assembly of FIG. 1 as viewed from the front of the airplane.

FIG. 7 shows a cross-sectional view of the spiral inducing assembly of FIG. 1 as viewed from the front of the airplane. Shown here is the primary tube 3a, the fins 6a and 17a, the ramjets 6b and 17b, the fuselage 4 of the airplane, the activation stems 9 and 20, linked by rivets to the protruding sections 8 and 19 respectively, the connecting rods 7 and 18 penetrating the primary tube 3a, and with the protruding sections 8 and 19 screwed in the connecting rods 7 and 18 respectively. FIG. 7 shows a way of supporting the primary tube 3a. Shown is a tube of smaller diameter 23 than the primary tube 3a. This smaller tube 23 is a supporting tube in that it is used to support the primary tube 3a. It has a smaller diameter than the primary tube 3a to provide a gap 24 between the primary tube 3a and the supporting tube 23. The gap 24 is used to allow freedom of movement to the protruding sections 8 and 19, and the activation stems 9 and 20 shown positioned inside the primary tube 3a. Bolts 25, 26, 27 and 28 are used to join the primary tube 3a to the supporting tube 23. The supporting tube 23 is able to rotate around the encircled part of the fuselage 4.

Figure 8:
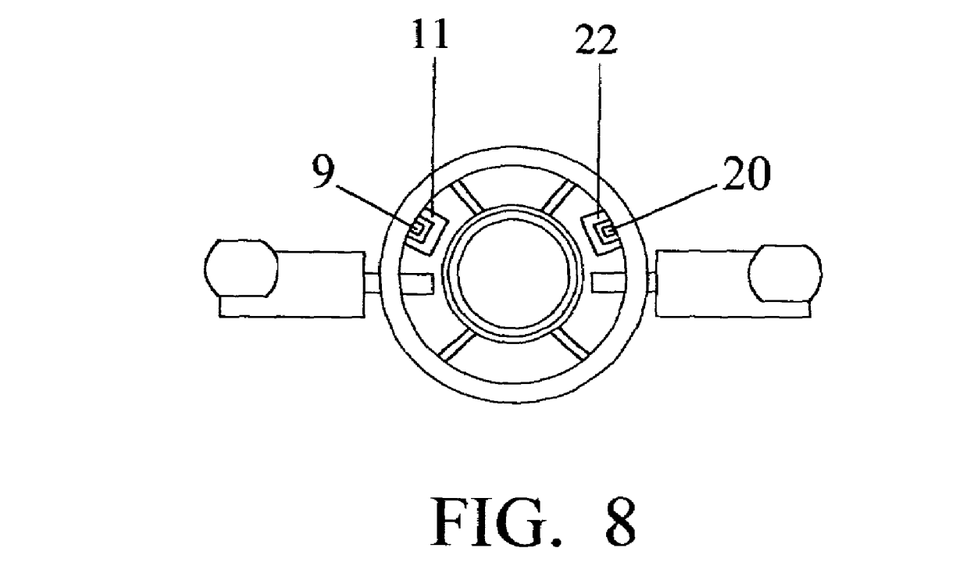
FIG. 8 shows a cross-sectional view of the spiral inducing assembly as viewed from behind the spiral inducing assembly.

FIG. 8 shows a cross-sectional view of the spiral inducing assembly as viewed from behind the spiral inducing assembly. Shown in FIG. 8 are the rear ends of the activation stems 9 and 20, and the retaining brackets 11 and 22 that support the activation stems 9 and 20, and prevent uncontrolled lateral movement of the activation stems 9 and 20.

Figure 9:
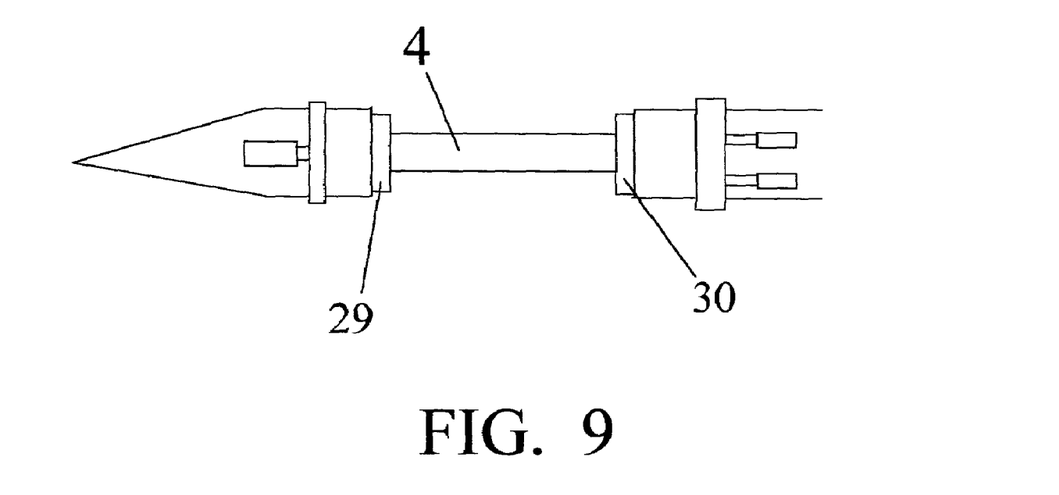
FIG. 9 shows the left side of the front of the fuselage of the airplane of FIG. 1.

FIG. 9 shows a side cutting of the part of the fuselage 4 encircled by the primary tube 3a of FIG. 1. The encircled part of the fuselage 4 can be seen to be narrower than the rest of the fuselage 4. Thrust bearings 29 and 30 are positioned on the narrowed section of fuselage 4. The thrust bearings are used to prevent the primary tube moving longitudinally relative to the fuselage 4.

Figure 10:
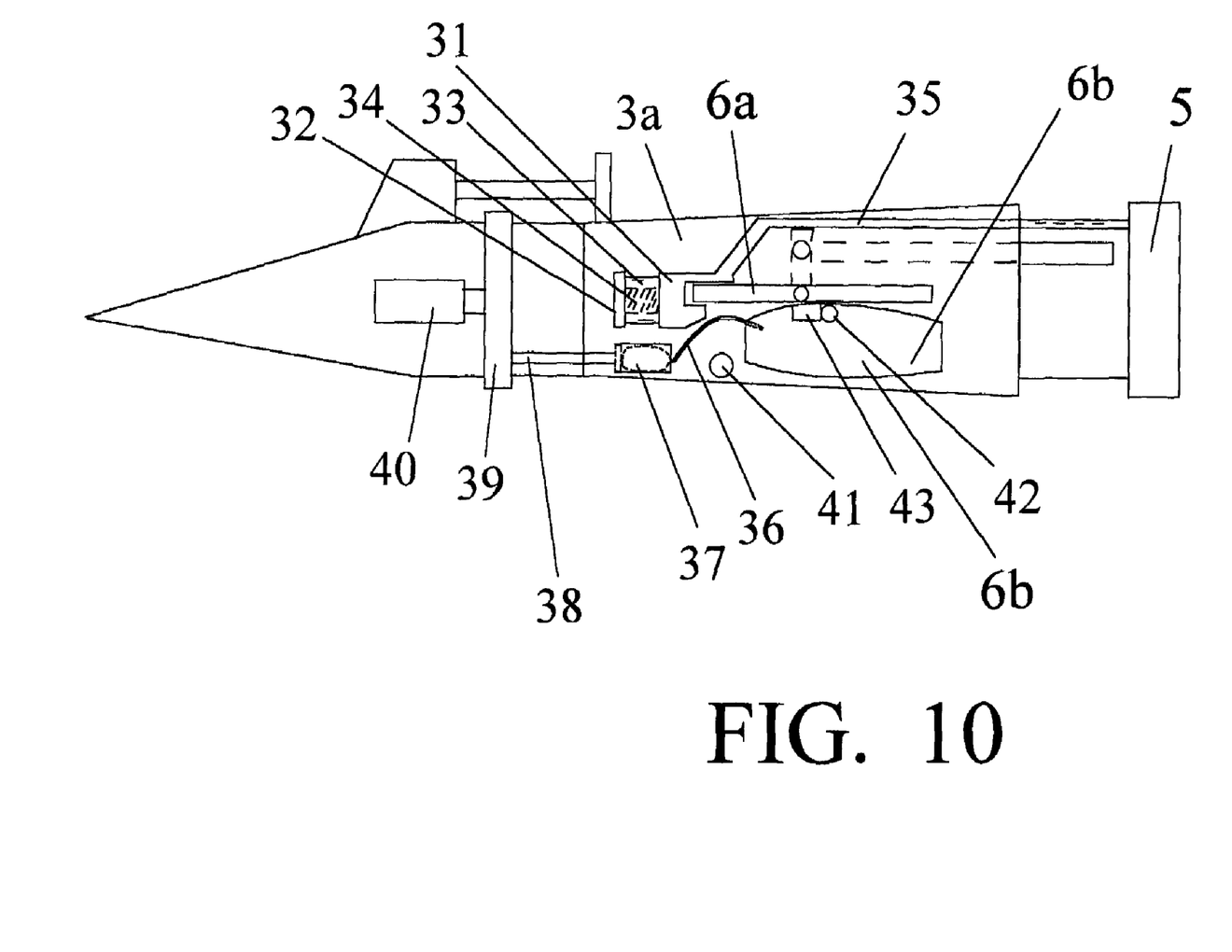
FIG. 10 shows how fuel can be delivered to a rotating thrust producing motor.

FIG. 10 shows a locking mechanism 31 by which the ramjet 6*b* could be restrained in a horizontal position during flight. The locking mechanism is connected to a rigid support 32 on rotate-able tube 3*a* by a telescopic tube 33. The telescopic tube 33 contains a spring 34 to force the locking mechanism 31 towards the fin 6*a*. A stem 35 protruding from the locking mechanism is used to move the locking mechanism forward when the tube 5 is move forward, thereby allowing the ramjet 6*b* to be rotated. FIG. 10 also shows a fuel line 36 for delivering fuel to the ramjet from a fuel containing bladder 37 in a cylinder. A flat long piece of metal 38 pushing a piston is used to force fuel from the bladder 37 into the fuel line. The flat piece of metal 38 is forced to move by a moveable tube 39. The tube 39 is forced to move by hydraulic actuator 40. Hence fuel can be supplied either with rotate-able tube 3*a* is rotating or when it is not rotating. The fuel line 36, the bladder 37 and the flat piece of metal 38 are attached to the rotate-able tube 3*a*. A protruding section 41 prevents the fin 6*a* from being rotated beyond that protruding section. A spark plug 42 receives electrical charge from a battery 43, thereby providing an ignition source.

Figure 11:
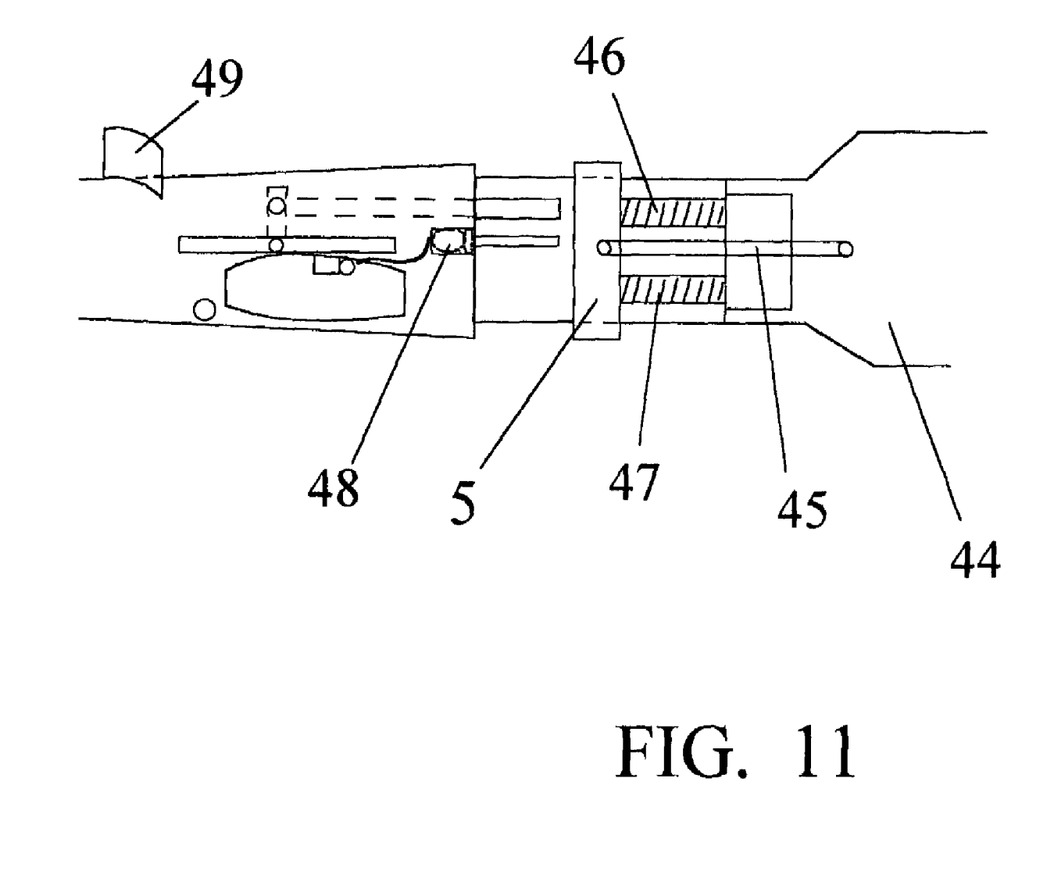
FIG. 11 shows how the mechanism could be adapted to fit a multi-stage missile, for automatic spiraling activation on separation of the final stage.

FIG. 11 shows how the spiraling mechanism can be fitted to a multi-stage missile. The secondary or final stage comprises the spiraling mechanism, which is connected to the primary stage 44. When the secondary stage ignites for separation from the primary stage, a nylon cord 45 is burnt off, releasing the moveable tube 5 and allowing the springs 46 and 47 to push the moveable tube 5 forward on the secondary stage of the missile. The rotate-able tube could be fitted with a fuel supply system as shown previously, with the movable tube 5 being used to force fuel to flow from a bladder 48. The bladder could be made to carry fuel for a jet engine or a chemical that could react with a solid fuel to ignite solid fuel rocket motors. Shown also is a fin 49 that could be used to cause the rotate-able tube to rotate due to dynamic action by air on the fin.

The invention claimed is:

1. An aircraft comprising a tube, which tube encircles part of the aircraft and is able to rotate relative to the encircled part of the aircraft, and which tube comprises a plurality of means for producing thrust, with at least one means for producing thrust connected to the tube such that the at least one means for producing thrust is able to be rotated in a pivoting manner relative to the tube, and with at least one additional means for producing thrust connected to the tube such that the at least one additional means for producing thrust is able to be rotated in a pivoting manner relative to the tube, and which said aircraft comprises a means to rotate the at least one means for producing thrust in a pivoting manner relative to the tube and a means to rotate the at least one additional means for producing thrust in a pivoting manner relative to the tube such that the at least one means for producing thrust can be rotated in a pivoting manner relative to the tube in a same direction as a direction of rotation in a pivoting manner of the at least one additional means for producing thrust relative to the tube.

2. The aircraft of claim 1 wherein the means to rotate the at least one means for producing thrust and the means to rotate the at least one additional means for producing thrust are such that rotation of the at least one means for producing thrust in a pivoting manner relative to the tube can cause rotation of the at least one additional means for producing thrust in a pivoting manner relative to the tube in a same direction as a direction of rotation in a pivoting manner of the at least one means for producing thrust relative to the tube.

3. An aircraft comprising a tube, which tube encircles part of the aircraft and is able to rotate relative to the encircled part of the aircraft, and which tube comprises at least one means for producing thrust, which at least one means for producing thrust is connected to the tube such is that the at least one means for producing thrust is able to be rotated in a pivoting manner relative to the tube, and which aircraft comprises a plurality of sections which can be separated and a means to rotate the at least one means for producing thrust such that separation of the sections is able to cause rotation of the at least one means for producing thrust in a pivoting manner relative to the tube.

4. The aircraft of claim 1 wherein the said same direction is such that rotation of the at least one means for producing thrust in a pivoting manner relative to the tube is substantially in the same direction as a direction of rotation of the at least one additional means for producing thrust in a pivoting manner relative to the tube.

5. The aircraft of claim 2 wherein the said same direction is such that rotation of the at least one means for producing thrust in a pivoting manner relative to the tube is substantially in the same direction as a direction of rotation of the at least one additional means for producing thrust in a pivoting manner relative to the tube.

6. The aircraft of claim 3 wherein the tube comprises at least one additional means for producing thrust and which at least one additional means for producing thrust is connected to the tube such that the at least one additional means for producing thrust is able to be rotated in a pivoting manner relative to the tube, and which aircraft comprises a means to rotate the at least one additional means for producing thrust such that separation of the said sections is able to cause rotation of the at least one additional means for producing thrust in a pivoting manner relative to the tube.

7. The aircraft of claim 6 wherein the means to rotate the at least one means for producing thrust and the means to rotate the at least one additional means for producing thrust are such that separation of the said sections is able to cause rotation of the at least one means for producing thrust in a pivoting manner relative to the tube and rotation of the at least one additional means for producing thrust in a pivoting manner relative to the tube, and such that the at least one means for producing thrust can be caused to rotate in a pivoting manner in a same direction as a direction of rotation in a pivoting manner of the at least one additional means for producing thrust relative to the tube.

8. The aircraft of claim 7 wherein the said same direction is such that rotation of the at least one means for producing thrust is substantially in a same direction relative to the tube as a direction rotation of the at least one additional means for producing thrust.

9. The aircraft of claim 1 wherein the said aircraft is a missile.

10. The aircraft of claim 2 wherein the said aircraft is a missile.

11. The aircraft of claim 3 wherein the said aircraft is a missile.

12. The aircraft of claim 4 wherein the said aircraft is a missile.

13. The aircraft of claim 5 wherein the said aircraft is a missile.

14. The aircraft of claim 6 wherein the said aircraft is a missile.

15. The aircraft of claim 7 wherein the said aircraft is a missile.

16. The aircraft of claim 8 wherein the said aircraft is a missile.

17. An aircraft comprising a tube, which tube encircles part of the aircraft and is able to rotate relative to the encircled part of the aircraft, and which tube comprises at least one means for producing thrust, which said at least one means for producing thrust is able to produce thrust in a direction such that the tube could be forced to rotate in one direction relative to the encircled part of the aircraft as a result of thrust produced by the at least one means for producing thrust, and the tube comprises at least one additional means for producing thrust, which at least one additional means for producing thrust is able to produce thrust in a direction such that as a result of the thrust produced by the at least one additional means for producing thrust the tube could be forced to rotate in a direction that is opposite to the said one direction if no other force acted on the tube.

18. The aircraft of claim 17 wherein the said aircraft is a missile.

* * * * *